United States Patent [19]

Dochterman

[11] B 3,997,805
[45] Dec. 14, 1976

[54] RESILIENT ELECTRIC MOTOR BEARING SEAL

[75] Inventor: Richard W. Dochterman, Fort Wayne, Ind.

[73] Assignee: General Electric Company, Fort Wayne, Ind.

[22] Filed: Apr. 8, 1974

[21] Appl. No.: 458,500

[44] Published under the second Trial Voluntary Protest Program on February 24, 1976 as document No. B 458,500.

[52] U.S. Cl. .................. 310/90; 277/38; 277/70; 277/82; 277/88; 277/90; 277/134; 308/36.1

[51] Int. Cl.² .............. F16C 33/78; F16J 15/32; F16J 15/52; H02K 5/16

[58] Field of Search ............... 277/88, 90, 38, 70, 277/82, 134; 308/36.1, 127; 74/18.1; 310/90, 63; 55/363

[56] References Cited

UNITED STATES PATENTS

| 1,370,803 | 3/1921 | Fesler | 308/36.1 |
|---|---|---|---|
| 2,783,067 | 2/1957 | Foss | 308/36.1 |
| 2,905,267 | 9/1959 | Thompson | 55/363 |
| 3,062,939 | 11/1962 | Kiespe et al. | 74/18.1 |
| 3,141,708 | 7/1964 | Evangelista | 308/36.1 |
| 3,243,617 | 3/1966 | Cunningham | 310/63 |
| 3,250,579 | 5/1966 | Tupper et al. | 308/127 |
| 3,499,654 | 3/1970 | Lower | 277/82 |
| 3,785,660 | 1/1974 | Bush | 277/134 |
| 3,788,650 | 1/1974 | Place | 277/38 |
| 3,788,653 | 1/1974 | Sigmon | 277/70 |
| 3,794,392 | 2/1974 | Scott | 308/36.1 |

Primary Examiner—Robert J. Spar
Assistant Examiner—Howard Beltran
Attorney, Agent, or Firm—Ralph E. Krisher, Jr.

[57] ABSTRACT

Seal arrangement to be used with dynamoelectric machines having a bearing and shaft combination. Seal is formed from resilient material in a sinuous shape providing a radial clearance for the rotatable shaft. Portion of seal mates with rotating seal engaging member and provides a sliding surface which is self-lubricating. Sinuous shape of seal allows deflection under pressure to lessen sliding surface pressure and conforms to variations in shaft alignment.

11 Claims, 5 Drawing Figures

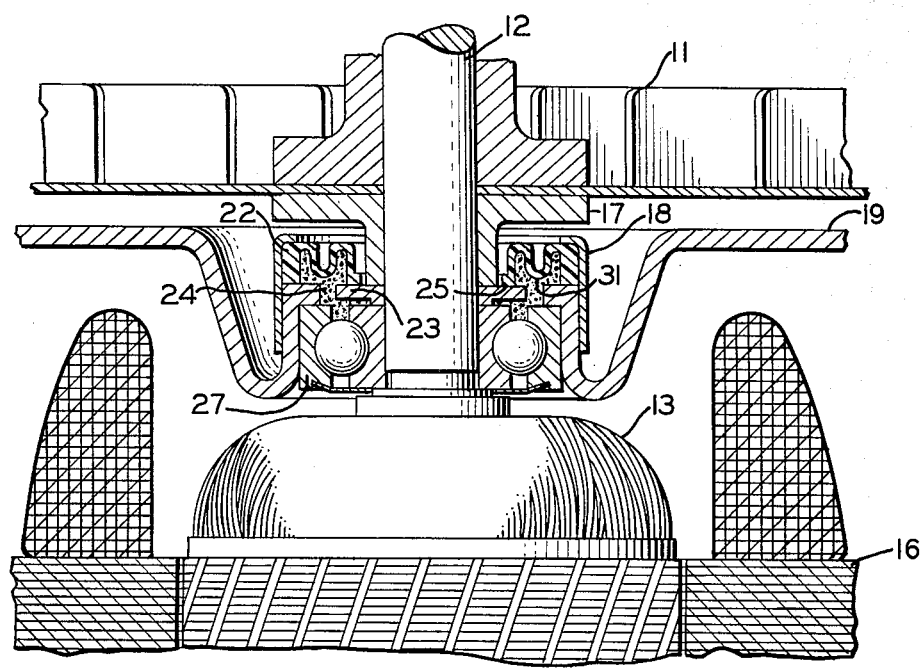
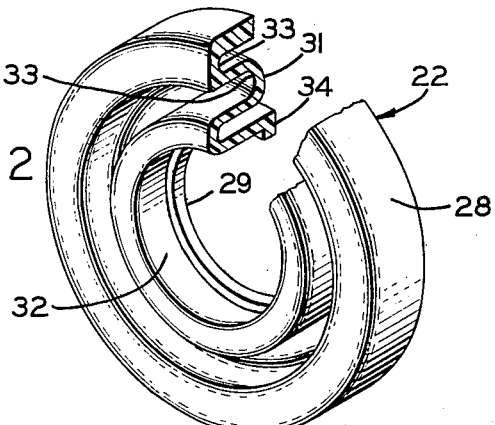
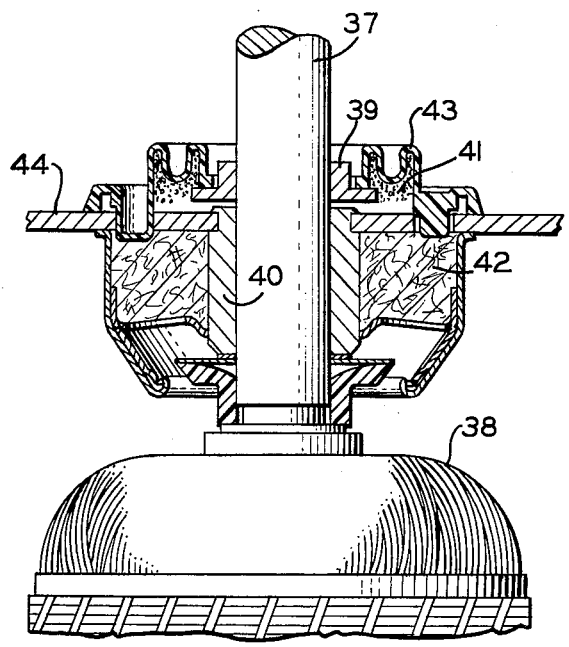
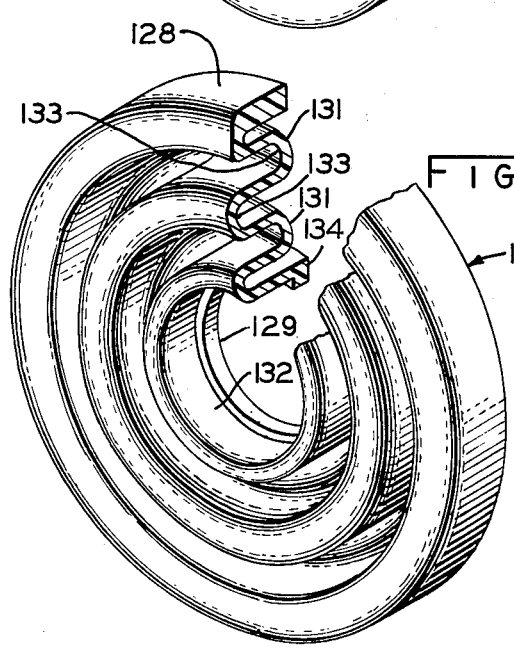

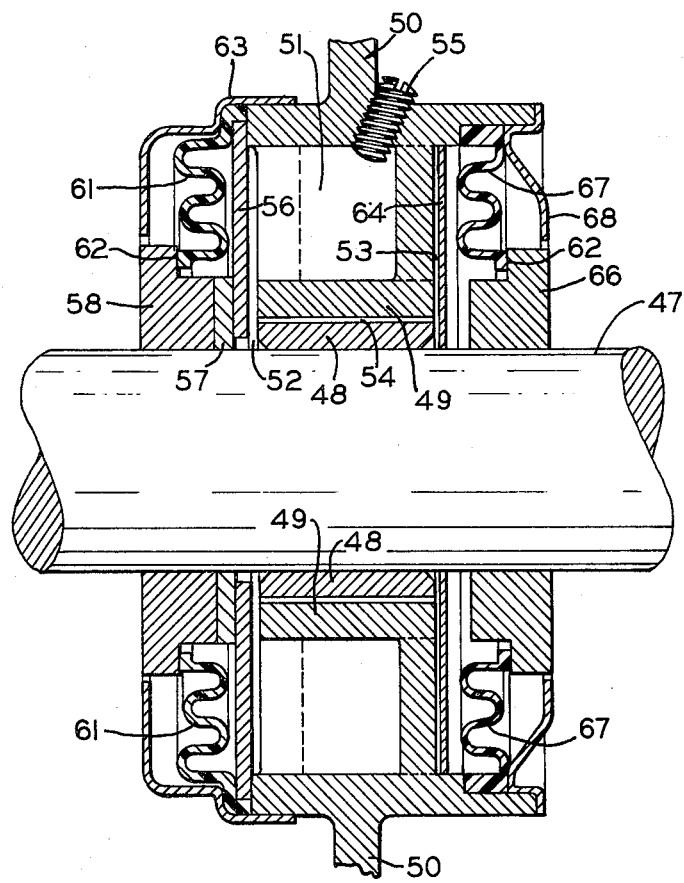

RESILIENT ELECTRIC MOTOR BEARING SEAL

BACKGROUND OF THE INVENTION

This invention relates in general to sealing arrangements for a bearing and shaft combination and, more particularly, to dynamoelectric machines, e.g., electric motors having bearing sealing arrangements.

In many applications of electric motors, generators, or alternators the environment is laden with dust, dirt, powder from material processing, moisture or vapors of various fluids, and mixtures of these and other contaminants which if not excluded reduce the performance and operating life of a bearing. The entrainment of these contaminants in the greases and oils used to lubricate bearings causes wear of the bearing materials by abrasion and corrosion, loss of lubricant by displacing or syphoning the lubricant from the reservoirs, and destruction of the lubricating properties of the greases and oils through dilution, thickening, or chemical attack.

Typical electric motor applications where severe environments are found include, for example, motors and generators used in railway cars, dairies, grain and feed mills, chemical processing plants, chickenhouses, air conditioning systems, construction equipment, and commercial and domestic appliances.

In the past, flexible seals of rubber or similar material have been used; however, these flexible seals have had certain shortcomings that have resulted in excessive wear and premature failure, or failure to be adaptable to excessive shaft misalignment and thus permitting leakage of the lubricant. To overcome these shortcomings labyrinth type seals which normally rquire a metal casing to retain their form and shape (which in turn increases the cost of the seal) have been used. Labyrinth seals of this type are shown, for example, in FIG. 6 of Scott's U.S. Pat. No. 3,794,392; and in FIG. 3 of Lower's U.S. Pat. No. 3,499,654. Face type seals have also been used to seal or prevent the leakage of a fluid or gas around a rotatable member like a motor shaft. Face type seals usually include a spring, bellows, and sealing ring. In order to work properly for any period of time, face type seals need to be supplied with some kind of lubrication at the sealing surfaces. The fluid being contained often provides this lubrication. Without lubrication a face type seal will fail rapidly because of seal surface wear. One example of a carbon ring having a sealing face is shown in FIG. 1 of Place's U.S. Pat. No. 3,788,650.

There is a definite advantage in forming a resilient seal that does not require a metal casing and that does not require the addition of lubricant to the fluids being contained thereby. Solutions of the above problems will be discussed in more detail hereinafter and it will be seen that the resolution of these and other problems would be particularly desirable.

Accordingly, it is an object of the present invention to provide a sealing arrangement having a resilient seal.

Another object of the invention is to provide an improved dynamoelectric machine having a bearing sealing arrangement wherein a seal is essentially self-lubricating and of long life.

Yet another object of the invention is to provide a bearing sealing arrangement wherein a seal is of a sinuous shape so that the seal may deflect under pressure and conform to variations in shaft alignment, and so that such pressure does not materially increase the engagement pressure on the contact surfaces of the seal.

SUMMARY OF THE INVENTION

In carrying out the above and other objects in one preferred form, I provide a dynamoelectric machine having a bearing system, shaft, and improved sealing arrangement. The sealing arrangement prevents contaminants like water and dirt from entering the bearing and also prevents the loss of lubricant from the bearing system through an opening for a rotatable shaft.

The sealing arrangement includes a seal; and a seal engaging member that may be in the form of a collar or disc which fits on, and rotates with, the shaft next to the bearing. The collar or disc may be part of a thrust runner. This disc is made of a non-corroding material and may be ceramic, carbon, nickel-iron alloy, or a plastic material which can be ground or lapped to a very flat finish on the sealing surface. A self-loading sinuous shaped seal made of a resilient material is positioned so as to contact a sliding surface of the disc (or any suitable part of a thrust system) and a stationary portion of the bearing housing. Bearing lubricant is utilized to provide a small amount of lubrication for the sliding interface of the rotating disc and the stationary self-loading resilient seal. The sinuous design of the resilient seal provides a spring effect and thus reduces or limits the load on the sealing surface. This results in minimum wear and lowers the stress levels on the resilient material to a value below the resilient material flow range, and yet maintains suitable contact between the sealing surfaces should a small amount of sear occur. At least part of the rotatable structure (which may include a shaft, spacer or disc, or collar) is accommodated with a radial clearance in a circumferentially extending opening in the seal.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

BRIEF DESCRIPTION OF THE DRAWINGS

FIG. 1 is an elevational view, with parts in section, parts removed, and parts broken away, of an embodiment of the invention in the form of an electric motor having a improved sealing arrangement;

FIG. 2 is a perspective view of one form of seal with a portion removed, that may be used in embodiments of my invention;

FIG. 3 is a perspective view, with a portion removed, of another form of seal that may be used in sealing arrangements embodying the invention;

FIG. 4 is an elevational view, with parts in section, parts removed, and parts broken away, of an electric motor illustrating another sealing arrangement and embodying my invention in still another form; and FIG. 5 is a view in elevation of parts of an electric motor with parts in section and parts broken away showing yet another sealing arrangement and embodying the invention in another form.

DESCRIPTION OF THE PREFERRED EMBODIMENTS

Referring now to FIG. 1, for purposes of illustration, I have shown an electric motor for the purpose of describing one preferred exemplification of the invention. The motor includes a movable assembly comprising rotor 13, and shaft 12; and a stationary assembly comprising a stator assembly 16. The stator assembly includes a magnetic core, winding, and frames, and housing means. This type of construction is shown for example, in U.S. Pat. Nos. 2,905,267 and 3,243,617 the disclosures of which are incorporated herein by reference, it being understood that other types and forms of motors may embody the invention.

An impeller 11 is mounted on shaft 12, and a spacer 17 is provided between impeller 11 and rotating seal engaging member or disc. 23. Cup 18 fits around shaft 12 and mates tightly with motor end shield 19 while retaining and protecting the seal 22 in place. Seal 22 has opening 29 (see FIG. 2) which accommodates spacer 17 mounted on shaft 12. The opening wall which surrounds part of spacer 17 is spaced therefrom so as to provide a circumferentially extending radial clearance therebetween, as clearly revealed in FIG. 1. The surface of seal 22 that defines seal opening 29 mates with seal engaging member or disc 23 to establish a sliding interface 25. Sliding interface 25 receives a small but sufficient amount of lubricant from lubricating grease which is provided with bearing assembly 27. Besides the lubricant which is normally supplied with a bearing, additional grease 24 can be added at the time of assembly which will increase the supply of bearing grease lubrication. Outer periphery wall 28 (see FIG. 2) of the seal 22 is in contact with stationary cup 18 and stationary motor end shield 19. The seal is initially positioned so as to be preloaded and thus exert an axial preloading force on disc 23 at sliding interface 25. The wavy or sinuous design of seal 22 provides a spring effect which serves to limit the resultant contact force for small deflections of seal 22 along the sealing interface 25. This contributes to minimum wear and lowers the stress levels in lip 34 (see FIG. 2) of seal 22 to a value below the plastic flow range of the seal material. The resiliency of seal 22 helps maintain the contact between seal 22 and disc 23 at sealing interface 25 should a small amount of wear occur. The one piece resilient seal 22 eliminates the need for separate springs, bellows, and sealing rings that would be rquired if face type seals were to be used.

FIG. 3 shows a seal similar to the one shown in FIGS. 1 and 2. The only difference in seal 22 shown in FIG. 2 and seal 122 shown in FIG. 3 is that seal 122 has more undulations than seal 22. Thus, the description of seal 22 will also apply to seal 122. Seal 22 (or 122) is formed with an opening 29 (or 129) which will accommodate, with a circumferentially extending radial clearance, a shaft or other rotating member mounted on the shaft. The outer periphery of seal 22 (or 122) is formed by wall 28 (or 128) and the shape or design of the seal from outer wall 28 (or 128) to opening 29 (or 129) is wavy or sinuous. The waves form troughs 33 or 133, as the case may be. Opening 29 (or 129) is surrounded by wall 32 (or 132) which establishes the previously mentioned radial clearance. The material between wall 28 (or 128) and wall 32 (or 132) is formed to a uniform thickness. The portion or crest 31 (or crests 131) does not extend to the same height as lip 34 (or 134). Or more explicitly, crest 31 as seen in FIG. 1 is at a higher vertical level than interface 25. This will allow for greater deflection of the seal without having the portion of the seal between wall 28 and wall 32 come in contact with a rotating member. Wall 32 has a lip 34 that defines opening 29. Lip 34 establishes a flat smooth contact surface that mates with a smooth rotatable disc to form a sliding interface shown as 25 in FIG. 1. The contact surface of lip 34 maintains effective contact with the rotatable disc.

The seal can be made from a pliant plastic sealing material such as "Nylatron GS", a composition of nylon and molybdium disulfide ($MoS_2$). This is a well known low friction wear resistance material used widely for thrust bearings in electric motors. This material is sold under the tradename "Nylatron G.S." by the Polymer Corp. In my preferred embodiment I injection molded "Nylatron G.S." to form the seal. But it will be understood that any suitable long wearing, pliant plastic, moldable material could be used.

FIG. 4 shows still another embodiment of my invention. Shaft 37 is rotated by rotor 38 and has disc 39 mounted to shaft 37. Bearing lubricant retaining material 42 (for example grease, absorbent fibrous material such as felt, or any other suitable type of oil retaining material including extrudable materials) is contained by seal 43. At the time of assembly additional lubricant 41 (such as oil or grease) may be added. This additional lubricant can reach bearing 40 by capillary action as described in U.S. Pat. No. 3,250,579, which patent is assigned to the assignee of this invention and is incorporated herein by reference. Seal 43 is in rotatable contact with disc 39 and in stationary contact with motor end shield 44. Seal 43 is self-lubricating, just as seal 22 in FIG. 1. Lubricant 41 along with oil exuding from the end of porous bearing 40 provides sufficient lubrication to keep the sliding surfaces of the materials chosen from wearing and at the same time helps seal the contact of the surfaces to exclude contaminants from the bearing.

FIG. 5 illustrates another use of my sealing arrangement. Here the sealing arrangement is used on both ends of a bearing assembly. Motor shaft 47 rotates in bearing 48 which is mounted in hub 49. Hub 49 is formed as part of motor end shield 50. Bearing 48 is lubricated by oil from free oil reservoir 51 which can be filled by removal of threaded fill plug 55. Since the shaft 47 might be operated in various orientations, capillary feed passages 52, 53, 54 are provided to conduct oil to bearing 48 and to thrust washer 57. Capillary feed passage 54, which is located adjacent bearing 48, is formed by grooves spaced around hub 49. Annular plate 64 cooperates with end shield 50 to provide another capillary feed passage 53. Yet another passage 52 is formed on the opposite end of bearing 48 by annular thrust plate 56. One end of plate 56 is in rotatable contact with thrust washer 57 which is made of a low friction material. Washer 57 mates with thrust collar or disc 58 mounted on shaft 47. Collar 58 performs a dual function as a thrust collar and as a seal engaging member. Usually collar 58 is press fitted on shaft 47, as is collar or disc 66. It will be recognized that a thrust washer may be added between collar 66 and annular plate 64 to provide thrust capability in either direction of axial movement of shaft 47. Discs 58 and 66 are formed with a flat smooth surface to mate with resilient seals 61 and 67, respectively forming sliding interfaces 62. Seals 61 and 67 also mate with end shield 50 and are held in place and protected by annular caps 63 and 68 respectively. As will be noted, the portions of seals 61 and 67 that mate with end shield 50 are chosen to be of configurations that mate with an end shield that is selected for a given application.

The disc or seal engaging member (e.g., runner 39 in FIG. 4 or runner 23 in FIG. 1) is usually made from a non-corroding material such as ceramic, carbon, nickel-iron alloy, or plastic materials which can be ground or lapped to a very flat finish on the sealing surface. In one actual construction, a disc was made of an alloy marketed by the International Nickel Co., under the tradename of "Niresist" and often used in corrosive environments. The disc is made to fit tightly on the shaft, thereby providing an effective seal around the circumference of the shaft.

In a reduction to practice of my invention, four direct drive centrifugal blowers were made with the seal assembly shown in FIG. 1 to seal the blower from the motor where the shaft enters the blower case. The four devices were cycled 58 minutes "on" at 9200 rpm and were "off" 2 minutes while tap water was fed into the blower intake continuously. During the two minute "off" period the water supplied filled the horizontally mounted blower to the level of the intake before spilling over. After 6000 hours of operation for two of the units the test was arbitarily terminated. The tests on the third and fourth units were terminated after 5300 and 3600 hours respectively because of failure of components other than the sealed bearing.

It will be appreciated, after comparing the preferred embodiments illustrated herein, that the smooth surfaces of the seals and the seal engaging members which form part of a sliding interface (e.g., interface 25 in FIG. 1) are oriented relative to a shaft so as to be oriented crosswise relative to the longitudinal direction of such shaft. Moreover, the sinuous shape of the preferred forms of seals illustrated herein is such that the surface or face of the seals along the sliding interface are movable in the longitudinal direction of the shaft. The sinuous shape of the seals, as spelled out hereinabove, influences the movement of the interface defining portions of the seals.

While the present invention has been described with reference to particular embodiments and exemplifications thereof in accordance with the Patent Statutes, it is to be understood that modifications may be made by those skilled in the art without actually departing from the invention. Therefore, I intend in the appended claims to cover all such equivalent variations as come within the true spirit and scope of the invention.

What I claim as new and desire to secure by Letters Patent of the United States is:

1. A dynamoelectric machine comprising a rotating member, rotatable structure including a shaft extending axially through the rotating member, a stator and coil winding assembly having a bore for receiving the rotating member, an enclosure containing the stator and coil winding assembly, and an end shield through which the shaft extends, the dynamoelectric machine further comprising:
   at least one bearing mounted to support the shaft for rotation;
   a seal engaging member mounted on the shaft; and
   a sealing member formed of a resilient material accommodated in a predetermined position relative to the seal engaging member and the end shield; the sealing member having a circumferentially extending wall defining an opening, the opening accommodating at least part of the rotatable structure with a radial clearance; the sealing member further having at least one sinuous in shape portion and a contact surface oriented crosswise relative to the shaft, with the contact surface effectively making mutual mating contact with the seal engaging member and with the sinuous in shape portion of the sealing member urging the contact surface thereof into effective mating contact between the contact surface of the seal and the seal engaging member even when the seal engaging member rotates in a misaligned manner.

2. For use in a dynamoelectric machine having a bearing and rotatable structure combination, said rotatable structure including a shaft, a rotatable seal engaging member mounted on the shaft and a sealing member formed of a resilient material; said sealing member having a surface defining an opening therein for accommodating at least part of the rotatable structure with a circumferentially extending radial clearance, with said surface being oriented generally crosswise relative to the shaft;
   said sealing member further having a wall defining an outer periphery; and
   said sealing member having at least one sinuous portion between a surface defining the opening and the outer periphery;
   the rotatable seal engaging member being in rotating contact with the surface defining the opening while the shaft is rotated, and the sinuous portion causing effective sealing contact to be maintained between the rotatable seal engaging member and the surface defining the opening when the seal engaging member is rotated in a misaligned fashion.

3. The invention of claim 2 wherein the surface defining the opening is disposed longitudinally in an axial direction further than any of the sinuous portion, thereby allowing the sinuous portion to deflect without contacting any rotating parts.

4. An improved dynamoelectric machine of the type having a stator, a rotor, a rotatable structure including a shaft extending axially through the rotor, at least one end shield through which the shaft extends, at least one bearing rotatably supporting the shaft, a seal engaging member, and a seal structure for the bearing and shaft wherein the improvement comprises:
   a molded resilient seal having a first and second side, an outer peripheral wall, and
   an inner wall determining the location of an opening for accommodating at least part of the rotatable structure with a circumferentially extending radial clearance, with
   the outer peripheral wall and inner wall extending from the first side;
   the seal and seal engaging member being in rotatable contact along an interface oriented generally crosswise relative to the shaft;
   said seal being sinuous from the outer peripheral wall to the inner wall to allow said seal to easily deflect under pressure and to conform to shaft misalignment; and
   the first side being adapted to retain bearing lubricant.

5. The dynamoelectric machine of claim 4 further comprising a bearing surface formed on an extremity of the inner wall, the seal engaging member being a disc and the disc being mounted on the shaft in rotatable rubbing contact with the bearing surface so that effective sealing contact is maintained.

6. An electric motor having a stator, a rotatable member, a rotatable structure including a shaft supporting the rotatable member, a bearing rotatably supporting the shaft, and at least one sealing arrangement comprising a seal formed from resilient material and having a first wall defining an opening for accommodating at least part of the rotatable structure with a circumferentially extending radial clearance;

said seal having a first and second side and an outer periphery formed by a second wall;

said seal having a portion extending from the second wall to the first wall, at least part of said portion being sinuous in shape; and a seal engaging member positioned on the shaft and having a smooth surface;

said seal being positioned around the shaft and being in rubbing contact with said seal engaging member to form a sliding seal interface oriented generally crosswise relative to the shaft thereby to prevent contaminants from entering the bearing.

7. The electric motor of claim 6 wherein said bearing has a first end and an opposite end and wherein; a first sealing arrangement is located on the first end of the bearing and another sealing arrangement is located on the opposite end of the bearing.

8. The electric motor of claim 6 wherein the sinuous portion of the seal provides a spring effect, and the seal is preloaded against the seal engaging member.

9. The electric motor of claim 8 wherein the smooth surface of the seal engaging member is oriented crosswise relative to the longitudinal direction of the shaft; the seal is provided with a seal surface that defines a shaft accommodating opening, and said seal surface is oriented crosswise relative to the longitudinal direction of the shaft; and the sinuous portion of the seal urges said seal surface generally in the longitudinal direction of the shaft and against said smooth surface.

10. An electric motor having a stator, a rotatable member, a rotatable structure including a shaft extending axially through the rotatable member, a bearing assembly rotatably supporting the shaft, the bearing assembly including a bearing and lubricant, and a seal arrangement positioned around the shaft comprising a seal made from a resilient material and having an opening for accommodating at least part of the rotatable structure with a circumferentially extending radial clearance;

said seal having a first and second side, an outer periphery, and a flat surface formed around the shaft accommodating opening of the seal;

a smooth seal engaging surface rotatable with the shaft and mating with the flat surface to form a sliding interface oriented generally crosswise relative to the shaft;

the sliding interface receiving a small amount of lubrication from lubricant provided for the bearing thereby reducing wear of said seal; and said seal having at least one sinuous in shape portion between the opening and the outer periphery thereby allowing said seal to deflect under pressure but yet causing effective sealing contact between the flat surface and the seal engaging member.

11. The electric motor of claim 10 wherein said seal is annular in shape and said sinuous shape allows said seal to conform to misalignments of the shaft.

* * * * *